(12) United States Patent
Rietman et al.

(10) Patent No.: US 9,871,585 B2
(45) Date of Patent: Jan. 16, 2018

(54) PROTOCOLS FOR VISIBLE LIGHT COMMUNICATIONS

(71) Applicant: PHILIPS LIGHTING HOLDING B.V., Eindhoven (NL)

(72) Inventors: Ronald Rietman, Eindhoven (NL); Robert James Davies, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 95 days.

(21) Appl. No.: 14/368,063

(22) PCT Filed: Dec. 12, 2012

(86) PCT No.: PCT/IB2012/057233
§ 371 (c)(1),
(2) Date: Jun. 23, 2014

(87) PCT Pub. No.: WO2013/093721
PCT Pub. Date: Jun. 27, 2013

(65) Prior Publication Data
US 2015/0071644 A1 Mar. 12, 2015

Related U.S. Application Data

(60) Provisional application No. 61/579,751, filed on Dec. 23, 2011.

(51) Int. Cl.
*H04B 10/116* (2013.01)
*H04L 29/06* (2006.01)
(52) U.S. Cl.
CPC ............ *H04B 10/116* (2013.01); *H04L 69/04* (2013.01); *H04L 69/22* (2013.01)

(58) Field of Classification Search
USPC .......................................................... 398/118
See application file for complete search history.

(56) References Cited

U.S. PATENT DOCUMENTS

| | | | | |
|---|---|---|---|---|
| 2006/0275041 A1* | 12/2006 | Kitaji | ....................... | H03D 9/00 398/182 |
| 2011/0299517 A1* | 12/2011 | Trainin | ................ | H04B 7/0417 370/338 |
| 2013/0154558 A1* | 6/2013 | Lee | ..................... | H04B 5/0037 320/108 |

OTHER PUBLICATIONS

IEEE Standard for Local and metropolitan area networks—Part 15.4: Low-Rate Wireless Personal Area Networks (LR-WPANs)—Approved Feb. 6, 2012 IEEE-SA Standards Board.*

(Continued)

*Primary Examiner* — David Payne
*Assistant Examiner* — Omar S Ismail
(74) *Attorney, Agent, or Firm* — Meenakshy Chakravorty

(57) ABSTRACT

The invention relates to the field of IEEE 802.15.4 based networks, and in particular to methods and devices for transmitting and receiving messages in IEEE 802.15.4 based networks. The existing IEEE 802.15.4 standard is further improved and adapted to better fit the properties of a network of lighting devices. The improvements and adaptations of the existing IEEE 802.15.4 standard allow for more flexible addressing. Bits which are indicative of use of address fields and/or whether one or two frame control fields is/are present in the ordered data portions of the message to be transmitted are defined by the device transmitting the message in the IEEE 802.15.4 based network. Existing features of the existing IEEE 802.15.4 standard protocol are retained.

17 Claims, 2 Drawing Sheets

(56) References Cited

OTHER PUBLICATIONS

Part 15.4: Low-Rate Wireless Personal Area Networks (LR-WPANs)—IEEE Standard for Local and metropolitan area networks—IEEE Std 802.15.4™—2011—Sep. 5, 2011.*

(IEEE Standard for Local and metropolitan area networks—Part 15.4: Low-Rate Wireless Personal Area Networks (LR-WPANs)—Sep. 5, 2011).*

"IEEE Standard for Local and Metropolitan Area Networks—Part 15.4: Low-Rate Wireless Personal Area Networks (LR-WPANs); IEEE Std 802.15.4-2011 (Revision of IEEE Std 802.15.4-2006)", IEEE Atandard, Piscataway, NJ, Sep. 5, 2011, pp. 1-314, XP017694668.

* cited by examiner

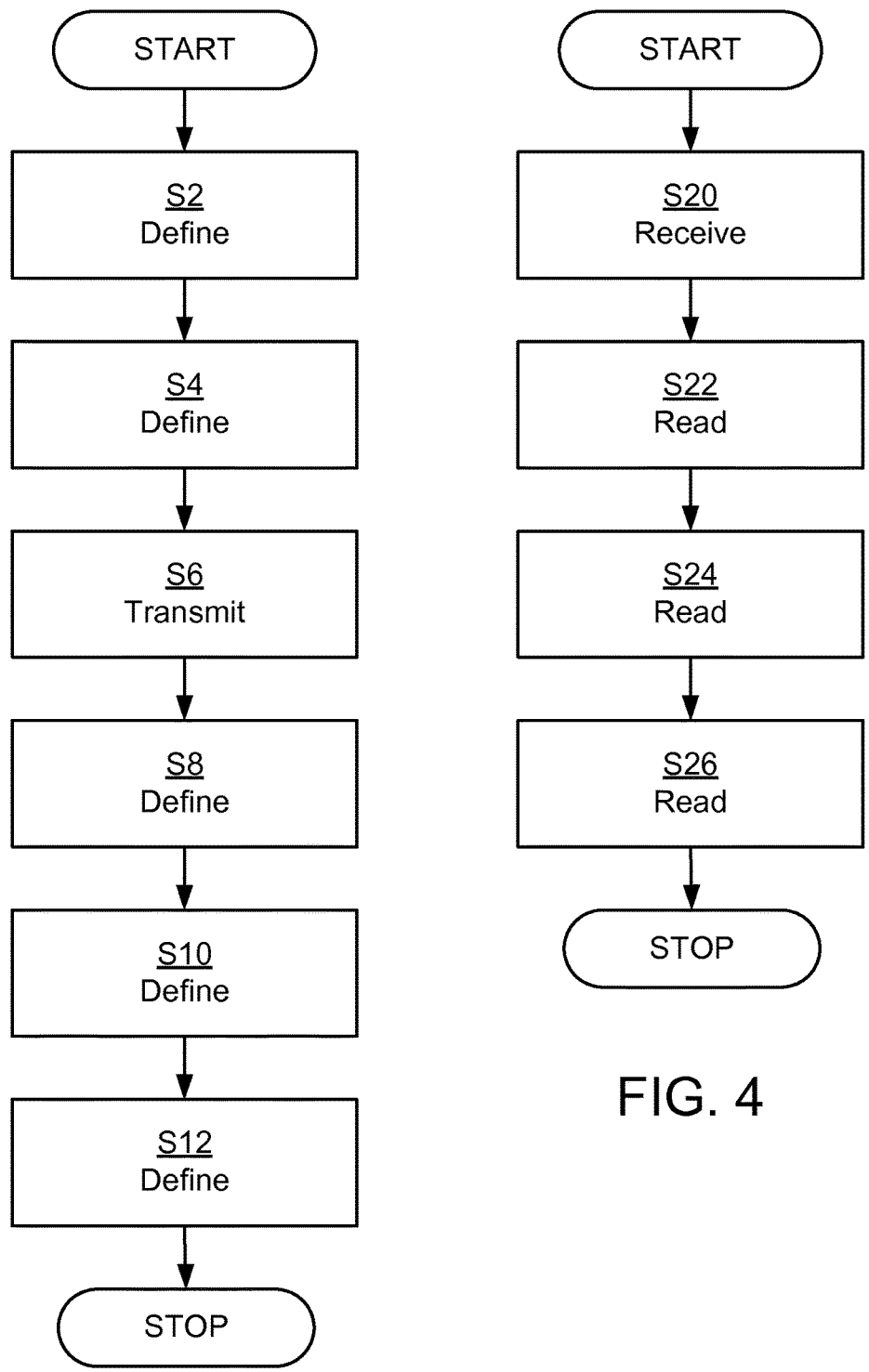

PROTOCOLS FOR VISIBLE LIGHT COMMUNICATIONS

CROSS-REFERENCE TO PRIOR APPLICATIONS

This application is the U.S. National Phase application under 35 U.S.C. § 371 of International Application No. PCT/IB2012/057233, filed on Dec. 12, 2012, which claims the benefit of [e.g., U.S. Provisional Patent Application No. or European Patent Application No.] 61/579,751, filed on Dec. 23, 2011. These applications are hereby incorporated by reference herein.

FIELD OF THE INVENTION

The invention relates to the field of IEEE 802.15.4 based networks, and in particular to methods and devices for transmitting and receiving messages in IEEE 802.15.4 based networks.

BACKGROUND OF THE INVENTION

Visible light has drawn recent interest as a new means of communication with recent developments in solid-state lighting that make it easier to accurately control light characteristics. Optical free space communications, i.e. visible light (VL) and infra-red (IR) communications, for the selection and advanced control of light sources has previously been proposed, and will be referred to as coded light (CL). The light emitted from a lighting device or luminaire, employing coded light comprises a modulated part (which for the human eye is invisible) associated with coded light comprising information messages. The emitted light also comprises an un-modulated part associated with an illumination contribution.

A visible light communications standard that is currently being developed is based on the existing IEEE 802.15.4 standard. In the existing IEEE 802.15.4 standard for wireless communication, devices may be grouped into a so-called personal area network, PAN. A PAN has an identifier that is two bytes long; and a device in a PAN may have a two-byte address assigned to it. Every device also has an eight-byte address. This eight-byte address is typically assigned to the device during manufacturing. If a device is not assigned to a PAN a default PAN identifier is used.

The existing IEEE 802.15.4 standard defines a medium access control, MAC layer. The MAC has a header which in turn has a frame control field, in which there are five bits that signal the way the source and destination addresses of a packet are transmitted in the MAC header. Two bits indicate the destination addressing mode, DAM. These two bits can take the decimal values 0, 1, 2, and 3. The value 0 means that neither the destination's PAN identifier, nor its address are transmitted. According to the existing IEEE 802.15.4 standard this implies that a source PAN identifier address must be present, unless the packet is a beacon or an acknowledgement (as indicated elsewhere in the frame control field), and that the packet is intended for the PAN coordinator of the PAN of which the identifier is transmitted in the source. The value 1 is reserved, and shall thus according to the existing IEEE 802.15.4 standard not be used. The value 2 means that the destination's PAN identifier is transmitted, as well as its two-byte address. The value 3 means that the destination's PAN identifier is transmitted, as well as its eight-byte address.

There are also two bits that indicate the source addressing mode, SAM, with similar meaning. If the source address is omitted, the packet must be an acknowledgement (as indicated elsewhere in the frame control field), or it must be sent by the PAN coordinator. A fifth bit, named 'PAN ID Compression Subfield' may be set to 1 if both source and destination addresses are present, which then indicates that the PAN identifiers of the source and destination are the same, and that therefore only the destination PAN identifier is transmitted and the source PAN identifier is omitted.

As noted above, a visible light communications standard (whereby the devices of the PAN preferably are luminaires and communicate by means of coded light) that is currently being developed is based on the existing IEEE 802.15.4 standard. The personal area network thereby becomes a visible are network, VAN.

SUMMARY OF THE INVENTION

A number of disadvantages of the cited art have been identified in light of the present invention. For example, one difference between the VAN and the PAN is that there is no coordinating device/luminaire in the VAN. Furthermore, the addressing modes defined according to the existing IEEE 802.15.4 standard have been shown to be insufficient, or inefficient, for a few applications. One application is a so-called shouter device. A shouter device sends information to whatever device that can receive/decode the message, and the shouter device does not expect a response. A shouter device does not even need to have a receiver for visible light communications. Neither is there any requirement that a transmitted package should be received correctly. This type of message is called an indiscriminate broadcast. Indiscriminate broadcast thus has a slightly different interpretation to the normal broadcast mode. A normal broadcast message is intended to be received and processed by every device that receives it. An indiscriminate broadcast message, on the other hand, is only intended to be received and processed by those devices that have a specific interest in the content of the message. Another application is the transmission and forwarding of control messages. In this application is does not matter which device sends the command, as long as all the intended receivers receive the message. This type of message is called an anonymous transmission.

In view of the above, an objective of the invention is to solve or at least reduce the problems discussed above. It is an objective of the present invention to further improve and adapt the existing IEEE 802.15.4 standard to better fit the properties of a VAN. It is a particular objective of this invention to propose improvements and adaptations of the existing IEEE 802.15.4 standard that allow for more flexible addressing. Generally, the above objectives are achieved by the attached patent claims. Proposed therefore are adaptations to the existing IEEE 802.15.4 standard protocol.

According to a first aspect of the present invention there is provided a method for transmitting a message in an IEEE 802.15.4 based network, the message comprising a sequence of ordered data portions, wherein the sequence of ordered data portions comprises address fields and one or two frame control fields, the method comprising: defining bits in a first subfield of the ordered data portions indicative of use of the address fields; and/or defining bits in a second subfield of the ordered data portions indicative of whether one or two frame control fields is/are present in the ordered data portions; and transmitting the message comprising the first subfields, the first frame control field and optionally, depending on the defined bits in the second subfield, the second frame control field.

According to a second aspect of the present invention there is provided a method for receiving a message in an IEEE 802.15.4 based network, the message comprising a sequence of ordered data portions, wherein the sequence of ordered data portions comprises address fields and one or two frame control fields, the method comprising: receiving the message; reading bits in a first subfield of the ordered data portions indicative of use of the address fields; and/or reading bits in a second subfield of the ordered data portions indicative of whether one or two frame control fields is/are present in the ordered data portions; and reading the first frame control field and optionally, depending on the bits in the second subfield, the second frame control field.

According to a third aspect of the present invention there is provided a transmitting lighting device for transmitting a message in an IEEE 802.15.4 based network, the message comprising a sequence of ordered data portions, wherein the sequence of ordered data portions comprises address fields and one or two frame control fields, the lighting device comprising: a processing unit arranged to define bits in a first subfield of the ordered data portions indicative of use of the address fields; and/or to define bits in a second subfield of the ordered data portions indicative of whether one or two frame control fields is/are present in the ordered data portions; and a transmitter arranged to transmit the message comprising the first subfields, the first frame control field and optionally, depending on the defined bits in the second subfield, the second frame control field.

According to a fourth aspect of the present invention there is provided a receiving lighting device for receiving a message in an IEEE 802.15.4 based network, the message comprising a sequence of ordered data portions, wherein the sequence of ordered data portions comprises address fields and one or two frame control fields, the lighting device comprising: a receiver arranged to receive the message; a processing unit arranged to reading bits in a first subfield of the ordered data portions indicative of use of the address fields; and/or to read bits in a second subfield of the ordered data portions indicative of whether one or two frame control fields is/are present in the ordered data portions; and to read the first frame control field and optionally, depending on the bits in the second subfield, the second frame control field.

Preferably the first frame control field and/or the second frame control field has a size of one octet of bytes, i.e. 64 bits.

Advantageously this prevents the transmission of redundant MAC header fields, especially when short data packets are being sent. Advantageously this allows adding addressing methods to the existing IEEE 802.15.4 standard protocol that allow the omission of redundant addressing fields. Advantageously this enables incorporating a header control compression scheme that allows header control subfields that are essentially static (when used with short data packets) to be grouped together into a field/octet that can be omitted from the transmitted data. The receiver is thereby arranged to, from the omission, infer the intended values of the omitted subfields. In other words: If the second control field is not present, the receiver may infer from this omission that everything that is normally defined in the second control field (i.e. all its subfields) takes on default values.

The message is preferably transmitted by visible light communications.

The message preferably comprises a medium access control, MAC, header. The MAC header preferably comprises a frame control field, and the frame control field preferably at least comprises the first subfield and the second subfield.

Advantageously the adaptation of the meaning carried by bits in the frame control field of the MAC header allows for more flexibility in the way they are used, thereby enabling, for example, an efficient signaling of indiscriminate broadcast and anonymous transmission. Firstly, more flexible use of address modes '0' allow anonymous transmissions and indiscriminate broadcasts. Secondly, the proposed scheme allows address modes '1' with meaning 'group identifier is not present, long address.' Preferably the long address has eight bytes. Thirdly, the interpretation of group ID compression bit is changed to mean: when set to 1, the destination group identifier is present (even when Destination Address Mode=0), the source group identifier is not transmitted and is equal to the destination group identifier. In this context the term group has a more general meaning than the term VAN. Further, advantageously the proposed scheme allows for shorter packet headers, which can give useful savings, especially in communication scenarios where each packet is flooded through a network.

These and other aspect of the invention will be apparent from and elucidated with reference to the embodiments described hereinafter. The advantages and embodiments of the first aspect equally apply to the second, third and fourth aspects, respectively, and vice versa.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which:

FIGS. 3 and 4 are flowcharts of a transmission and a receiving method, respectively, according to embodiments.

DETAILED DESCRIPTION OF EMBODIMENTS

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

New address formats for visible light communications applications that are more efficient for broadcast and multicast applications will now be described. The proposed address formats can advantageously be incorporated into the addressing scheme inherited from the existing IEEE 802.15.4 standard protocol by removal of some constraints and with new interpretations of at least some of the existing signaling.

However, preferably all the existing features of the existing IEEE 802.15.4 standard protocol should be retained. The inventors of the present invention have discovered that there is enough space in the bits available in the frame control field to accommodate both the proposed features and the existing features. The inventors of the present invention have further discovered that the interpretation of some of the bits advantageously is modified to accommodate the new features while retaining backwards compatibility with the existing features. The proposed bit codings are preferably arranged in such a way that the proposed features are a natural consequence of the codings.

Figure 1:
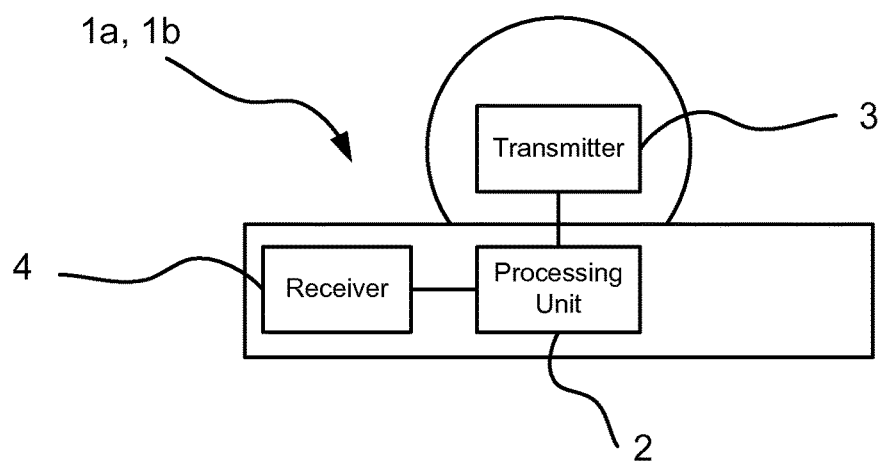
FIG. 1 illustrates a lighting device according to embodiments.
Figure 2:
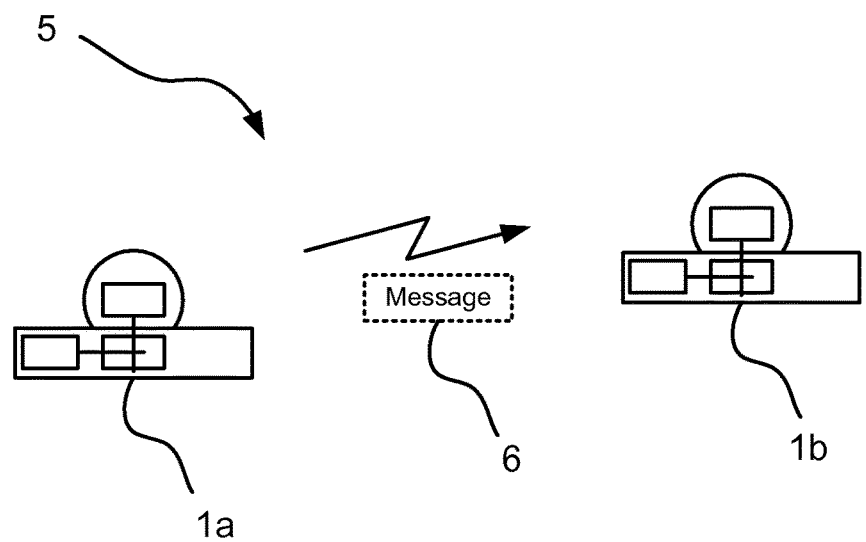
FIG. 2 illustrates an IEEE 802.15.4 based network.

Methods and devices for transmitting and/or receiving a message in an IEEE 802.15.4 based network will now be described with references to the lighting devices of FIG. 1, the IEEE 802.15.4 based network of FIG. 2 and the flowcharts of FIGS. 3 and 4. The message comprises a sequence of ordered data portions which in turn comprises address fields and one or two frame control fields/octets. FIG. 1 schematically illustrates, in terms of functional blocks, a lighting device 1a, 1b according to an embodiment. The lighting device 1a, 1b is preferably arranged to both transmit a message and to receive a message. However, by modifications which are apparent to the skilled person, the lighting device may be arranged to either transmit a message or to receive a message. A lighting device arranged to at least transmit a message is denoted a transmitting lighting device 1a. A lighting device arranged to at least receive a message is denoted a receiving lighting device 1b. FIG. 2 schematically illustrates an IEEE 802.15.4 based network 5 comprising a transmitting lighting device 1a transmitting message 6 to a receiving lighting device 1b. The lighting device 1a, 1b is preferably arranged for visible light communications and may thus be configured to emit illumination light as well as coded light, wherein the coded light comprises the message. The lighting device 1a, 1b comprises a processing unit 2, a transmitter 3, and a receiver 4. The transmitter 3 may have a light emitter associated with the illumination function of the light source 1a, 1b (i.e. for emitting the illumination light) and can be any suitable light source. For example, the light emitter preferably comprises one or more LEDs, but it could as very well comprise one or more halogen, FL, or HID sources, etc. The transmitter transmits a message as defined by the processing unit 2. The receiver 4, which may have a light detector arranged to detect visible light communications, and thus to receive a message transmitted by visible light communications, is arranged to receive light emitted by at least one other lighting device and in the received light detect coded light. The receiver 4 may comprise a photosensor or photodetector or any other suitable sensor of light. For example, the receiver 4 may comprise a charge-coupled device (CCD), CMOS sensor, a photodiode (inter alia a reverse biased LED), a phototransistor, a photoresistor, or the like.

According to the present invention a VAN device is enabled to send a broadcast to an entire VAN by using just the VAN ID as destination without the need to include the VAN broadcast address. There can be an optional source VAN address but, since the source VAN ID would be the same, it is preferably not transmitted. In general, the VAN is one example of a group G. It should be noted that the herein disclosed embodiments are, although described in a VAN context, also applicable for a general group of devices which not necessarily are part of a VAN. This structure achieves an extra bit of efficiency when broadcasting short messages. Making the source address optional provides anonymous transmission (whose purpose is mainly efficiency rather than a need to hide). Not transmitting a source address may be regarded as an efficiency issue within a VAN—the fact that a destination VAN has been specified means that it is not a true indiscriminate broadcast.

In order to achieve this the interpretation of the VAN_ID_compression bit to mean that, when set, there will always be a destination VAN id transmitted and the source VAN ID shall be assumed to be identical and never transmitted. As such, it over-rides destination address modes 0 and 1 (which do not carry the VAN ID) and source address modes 2 and 3 (which do carry the VAN ID). In a step S2 bits in a first subfield of the ordered data portions indicative of use of the address fields are therefore defined by the processing unit 2 of the transmitting lighting device 1a. Upon reception of a message 6 comprising the first subfield the processing unit 2 of the receiving lighting device 1b reads bits in the subfield of the ordered data portions indicative of use of the address fields, step S22.

Because of the over-riding ability of the new VAN_ID_compression bit, certain combinations produce similar results (e.g., expressing the settings as a triplet: v-d-s, where v represents the VAN ID compression bit, d represents the Destination Addressing Mode and s represents the Source Addressing Mode. Some examples of usage are:

0-0-1—Indiscriminate broadcast ('Shouter device'): Destination address not used (indicates to receiver that these broadcasts can be safely ignored), only long, such as 64-bit, source address used (receiver, RX, assumes VAN is not set and/or transmitter, TX, is not VAN capable)

0-1-1—Global point-to-point: Destination address is long, such as a 64-bit, address of specific device. No grouping involved 0-2-1—Global-to-local point-to-point: Destination address is a valid VAN ID and assigned middle length (16-bit) address within the VAN (Source address indicates source is not a member of any VAN)

0-2-1—Global-to-local VAN broadcast: As above but middle length (16-bit) address takes special value of 0xFFFF to indicate that all VAN members should receive this message (RX is obliged to pass up such messages to the upper layers)

0-2-1—Normal broadcast: Destination address and destination VAN field both take the special middle length (16-bit) setting of 0xFFFF (RX is obliged to pass up such messages to the upper layers)

0-2-2—As for 0-2-1 except source is member of different VAN (VAN IDs are different)

1-2-2—As for 0-2-2 except source is member of same VAN (VAN IDs are the same and source VAN is suppressed by VIC field)

1-2-1—As for 0-2-1 but VIC field can signal change in RX interpretation. Does not change address field generation since destination VAN ID is already present and source VAN id already not present 1-0-1—Indiscriminate broadcast to VAN: A way of broadcasting to a VAN that saves two bytes—VIC ensures presence of the necessary destination VAN ID, despite DAM of 0

1-0-2—As above but sender is a member of the VAN 1-0-0—Anonymous VAN broadcast—for those occasions when it does not matter which device that gave the command The similar results are due to two phenomena. Firstly, when VIC, VAN ID Compression, is set to one, it forces the destination VAN ID to be present and the source VAN ID to be suppressed. SAM and DAM can each be set to either 1 or 3 (long, such as a 64-bit, address, without/with VAN ID) with no change in the address fields. This allows extra information to be sent. Secondly, there are certain combinations of DAM (2 and 3) and SAM (0 and 1) that naturally produce a situation in which the destination VAN ID is present and the source VAN ID is not. The setting of VIC does not change this and could therefore be used to signal extra information to the receiver. The combinations listed may be grouped as follows: {1-1-1, 1-1-3, 1-3-1, 1-3-3} and {0-2-0, 1-2-0}, {0-2-1, 1-2-1, 1-2-3*}, {0-3-0, 1-3-0}, {0-3-1, 1-3-1, 1-3-3*}. The codes marked * take advantage of both phenomena and some codes appear in the list twice. Again, although this is a natural outcome of the coding scheme, it does make it possible for the transmitter to signal some extra information. For example, a setting of 1 or 3 as the source address with VIC set to 1, could inform the receiver whether the transmitter is able to take part in a closed group (or VAN) (3) or not (1). Many of the above variants use a DAM or SAM of 1, which is a reserved (i.e., invalid) value in the existing IEEE 802.15.4 standard protocol, and some use the VIC in ways not anticipated by 15.4, giving us the potential ability to guide the receiver in its interpretation.

According to the existing IEEE 802.15.4 standard protocol, the only time an address mode of '0' is used is in the special case of an exchange of packets between a VAN hub (in the existing IEEE 802.15.4 terminology: a PAN coordinator) and a member of that same VAN. By allowing address mode '0' to be used more widely, support of anonymous transmission (i.e. that the source address is not present), indiscriminate broadcast (i.e. that the destination address is not present) and the combination thereof is allowed.

According to the existing IEEE 802.15.4 standard protocol, address mode '1' is not supported. The two-bit address fields may according to the present invention be interpreted as containing one bit (bit 1) indicating the presence (1) or otherwise (0) of the address field and another bit (bit 0) indicating the type of address, short or long (according to the present non-limiting example 16 bit (0) or 64 bit (1)). According to this interpretation (and any implementation built around it), mode 1 and mode 0 both have bit 1 set to 0, meaning no address field, and are therefore equivalent in practice. In pseudocode, a procedure for receiving these bits may be written as:

```
IF (bit_1 = 0)
    THEN no_address present
    ELSE IF (bit_0 = 0)
        THEN 16_bit_address_present AND VAN_ID_present
        ELSE 64_bit_address_present AND VAN_ID_present
    ENDIF
ENDIF
```

A consequence of this is that, whenever there is an address, the VAN ID is always present. The inventors of the present invention have discovered that when long (64-bit) addresses are used, the address is often redundant. Therefore, long (64-bit) addresses are preferably not used.

The existing IEEE 802.15.4 standard protocol standardizes on mode 0, leaving mode 1 reserved, meaning that a packet using it should be considered invalid by the receiver and dropped. According to the present invention the interpretation is modified such that mode 1 has the following meaning as expressed in pseudocode:

```
IF (bit_0 = 1)
    THEN 64_bit address present
ENDIF
IF (bit_1 = 1)
    THEN VAN_ID_present
    IF (bit_0 = 0)
        THEN 16_bit_address_present
    ENDIF
ENDIF
```

Thus, bit 0 controls the presence of the long (64-bit) address field and bit 1 the presence of the VAN_ID and, if there is no long (64 bit) address, the presence of the middle (16-bit) address. Modes 0, 2 and 3 are the same but Mode 1 now generates a long (64-bit) address with no VAN_ID.

According to the existing IEEE 802.15.4 standard protocol, the VAN ID is essentially only used when a source or destination is a member of a VAN (or the destination address is a broadcast address). If a VAN member sends a message to another member of the same VAN, the two VAN IDs would be identical although only one needs to be transmitted. The VAN_ID_Compression is set to 1 to indicate this situation. Preferably this is the only time the VAN_ID_Compression bit is used.

The MAC header, MHR generally has the generic layout according to Table 1. The Auxiliary Security Header can be of arbitrary (arb.) size.

TABLE 1

| Octets: 2 | 1 | 0/2 | 0/2/8 | 0/2 | 0/2/8 | arb. |
|---|---|---|---|---|---|---|
| Frame Control | Sequence Number | Destination VAN Identifier | Destination Address | Source VAN Identifier | Source Address | Auxiliary Security Header |
| | | | Addressing fields | | | |
| | | | MHR | | | |

In turn, the frame control field of the MAC header has a number of subfields as shown in Table 2.

TABLE 2

| Bits: 0-2 | 3 | 4 | 5 | 6 | 7-9 | 10-11 | 12-13 | 14-15 |
|---|---|---|---|---|---|---|---|---|
| Frame Type | Security Enabled | Frame Pending | Ack. Request | VAN ID compression | Reserved | Destination Addressing Mode | Frame Version | Source Addressing Mode |

Three of these subfields are of particular relevance for the below disclosure, namely VAN ID compression, destination addressing mode, and source addressing mode. Bit 6 is set if the Source VAN identifier is identical to the destination VAN identifier and therefore omitted, step S8. Bits 10-11 and 14-15 independently take the decimal values:

0 if VAN ID and address are not present 2 if VAN ID and middle length (16-bit) address are present 3 if VAN ID and long (64-bit) address are present, and where 1 is an undefined value.

For notational purposes the settings may be represented as a triplet: v-d-s, where v represents bit 6, the VAN ID compression bit, d represents bits 10-11, the destination addressing mode, and s represents the source addressing mode.

A number of mechanism are inherited from the existing IEEE 802.15.4 standard protocol. In general, there is a source address and a destination address associated with each packet. Each address is made up of a middle length (16-bit) VAN ID and a long (64-bit) device address. The long (64-bit) device address is a fixed, globally-unique identifier that, for example, may be assigned to the device during manufacture and thus may not be changed during use. Unless a value has been allocated, the middle length (16-bit) VAN ID is set to 0xFFFF, meaning that no VAN ID has been assigned, see Table 3.

TABLE 3

| Octets: 2 | 1 | 2 | 8 | 2 | 8 |
|---|---|---|---|---|---|
| 0-3-3 | 0x-- | 0xFFFF | 0x123456789ABCDEF0 | 0xFFFF | 0x0FEDCBA87654321 |
| Frame Control | Sequence Number | Destination VAN Identifier | Destination Address | Source VAN Identifier | Source Address |
|  |  | Addressing fields |  |  |  |
|  |  | MHR |  |  |  |

In VAN-based scenarios, it is possible to allocate a middle length (16-bit) short ID to replace the long (64-bit) ID; at the same time, the VAN ID will be given a value other than all 1's (which has the specific meaning of 'unallocated'). These allocations are generated by the upper layers of a VAN hub, checking, where necessary, that no similar allocation exists within the coverage range of the hub. In use, middle length (16-bit) addresses is preferably used where available, else the default long (64-bit) address may be used. In the latter case, a VAN ID may or may not be allocated, see Table 4.

TABLE 4

| Octets: 2 | 1 | 2 | 2/8 | 2 | 2/8 |
|---|---|---|---|---|---|
| 0-2-2 | 0x-- | 0x1234 | 0x5678 | 0x90AB | 0xDEF0 |
| 0-2-3 |  | 0x1234 | 0x5678 | 0x90AB/FFFF | 0x0FEDCBA87654321 |
| 0-3-2 |  | 0x1234/FFFF | 0x123456789ABCDEF0 | 0x90AB | 0xDEF0 |
| Frame Control | Sequence Number | Destination VAN Identifier | Destination Address | Source VAN Identifier | Source Address |
|  |  | Addressing fields |  |  |  |
|  |  | MHR |  |  |  |

Moreover, a VAN hub sending a message to a VAN member may omit the source ID altogether—such a packet is preferably assumed to come from the VAN hub. A VAN member sending to the VAN hub may omit the destination ID altogether—such a packet is preferably assumed to be bound for the VAN hub, see Table 5.

TABLE 5

| Octets: 2 | 1 | 2/0 | 2/0 | 0/2 | 0/2 |
|---|---|---|---|---|---|
| 0-2-0 | 0x-- | 0x1234 | 0x5678 | — | — |
| 0-0-2 | — | — | — | 0x1234 | 0xDEF0 |
| Frame | Sequence | Destination | Destination | Source | Source |

TABLE 5-continued

| Octets: 2 | 1 | 2/0 | 2/0 | 0/2 | 0/2 |
|---|---|---|---|---|---|
| Control | Number | VAN Identifier | Address | VAN Identifier | Address |
| | | | Addressing fields | | |
| | | | MHR | | |

Also, a VAN member sending to another VAN member (of the same VAN) preferably includes both source and destination addresses but preferably omits one of the identical VAN IDs (the source VAN) and preferably signals this via the VAN compression bit in the header control field, see Table 6.

TABLE 6

| Octets: 2 | 1 | 2/0 | 2/0 | 0/2 | 0/2 |
|---|---|---|---|---|---|
| 1-2-2 | 0x-- | 0x1234 | 0x5678 | — | 0xDEF0 |
| Frame Control | Sequence Number | Destination VAN Identifier | Destination Address | Source VAN Identifier | Source Address |
| | | | Addressing fields | | |
| | | | MHR | | |

Preferably only the acknowledgement packet omits both addresses—it then uses its chronological proximity to the packet being acknowledged and the sequence number as its addressing mechanism.

In addition to inheriting a number of mechanism from the existing IEEE 802.15.4 standard protocol, a number of new mechanisms are proposed which advantageously enable unidirectional broadcast and bidirectional multicast signaling. By modifying the interpretation of existing fields, more efficient addressing modes can be made available.

Firstly, a number of adaptations have been proposed for unidirectional mode. Non-transceiver devices cannot support VAN functionality and therefore cannot be assigned VAN IDs and short addresses, and, by the normal rules of the existing IEEE 802.15.4 standard protocols disclosed above, cannot omit source or destination VAN and address fields. Some considerations to reducing the overhead have therefore been considered.

For a transmit-only device the source VAN ID is advantageously omitted. For a transmit-only device the source address may be omitted in its entirety. This creates an anonymous packet—the device identity may be sent in the payload if necessary to the application. For a transmit-only device the destination ID may be omitted if the destination is 'broadcast'. This creates an 'indiscriminate' or 'shouter' broadcast, which is a useful distinction from 'normal' broadcast. Packets sent to a receive-only device need not include a destination VAN-ID, see Table 7.

TABLE 7

| Octets: 2 | 1 | 2/0 | 8/0 | 0 | 8/0 |
|---|---|---|---|---|---|
| 1-3-3 | 0x-- | 0xFFFF | 0x123456789ABCDEF0 | — | 0x0FEDCBA987654321 |
| 0-3-0 | | 0xFFFF | 0x123456789ABCDEF0 | — | — |
| 0-0-0 | | — | — | — | — |
| 0-1?-3 | | — | 0x123456789ABCDEF0 | — | 0x0FEDCBA987654321 |
| Frame Control | Sequence Number | Destination VAN Identifier | Destination Address | Source VAN Identifier | Source Address |
| | | | Addressing fields | | |
| | | | MHR | | |

In Table 7 the '1-3-3' code implies that the Source VAN ID is the same as the destination VAN ID, i.e., 0xFFFF. An alternative coding is '0-3-1', using the new interpretation of '1' to mean 'no VAN ID, long (64-bit) address', step S10, step S12. In this case, the interpretation is that the source has no VAN ID and is not capable of being assigned one, which, in turn, implies that the device is probably a shouter device. Following on from this, '0-1-1' might be used by a shouter device transmitting to a receiver-only device.

Secondly, a number of adaptations have been proposed for multicast operation. For luminaire-to-luminaire scenarios, multicast operation may be more likely than unicast operation. A command received needs to be relayed to other devices in the VAN. Although a multicast function can be achieved by setting the destination address to 0xFFFF, this has been discovered to be inefficient when the bulk of the traffic is multicast. It may therefore be better to make unicast the exception in this case. For multicast operation it may be advantageous to include the destination VAN Identity but to omit the destination device address. It may also be advantageous to omit the source address in its entirety. In the latter case, the understanding of 'no source address' according to the existing IEEE 802.15.4 standard protocol may need to change so that the packet is not assumed to come from a VAN hub.

The codings in Table 8 imply a stronger meaning for the VAN compression bit. If set, there advantageously is no source VAN identifier present and, if necessary, it shall be assumed to take the value of the destination VAN ID, which preferably always is present. Address code 1 is invalid for both source and destination. Address code 0 has the interpretation, 'VAN indiscriminate broadcast' on the destination side and, 'VAN anonymous transmission' on the source side.

TABLE 8

| Octets: 2 | 1 | 2 | 0 | 0 | 2/0 |
|---|---|---|---|---|---|
| 1?-0?-2 | 0x-- | 0x1234 | — | — | 0x0FED |
| 1?-0?-0 | | 0x1234 | — | — | — |

TABLE 8-continued

| Octets: 2 | 1 | 2 | 0 | 0 | 2/0 |
|---|---|---|---|---|---|
| Frame Control | Sequence Number | Destination VAN Identifier | Destination Address | Source VAN Identifier | Source Address |
| | | | Addressing fields | | |
| | | MHR | | | |

While the long (64-bit) IDs may be unique to every device, the middle length (16-bit) VAN IDs are not guaranteed to be so. Having the allocation process handled within the visible light communications system rather than the application preferably allows automatic detection and resolution of any clashes. For this reason, permitting allocation of short addresses by the application may be considered disadvantageous.

There are at least two ways that this could be adapted to also for non-transceiver devices. One possibility is to make use of a digital addressable lighting interface, DALI, backbone structure to handle allocation and resolution of clashes with adjacent but otherwise unrelated systems. Another possibility is to derive short IDs from the least significant 16-bits of the 64-bit on the grounds that there is at least a chance that lamps from the same batch will all be different. Resolution of clashes, however, may be impossible or at least difficult. It may therefore be preferred that short addresses are not used with non-transceiver devices.

Anonymous transmission: Not sending the source ID creates an 'anonymous' transmission—whereby it is not possible at the visible light communications level to determine the device that sent it. It may then be up to the application to provide any sender authentication that would be required. From a communications perspective, replying to an anonymous packet may only be done via broadcast because the visible light communications address of the transmitting device is not known, even if an application or other upper layer address is contained within the payload. From an application perspective, this mode may be appropriate for command messages, for which the source of the command is a matter of supreme irrelevance.

Indiscriminate broadcast: Omitting the destination address allows a type of broadcast message termed 'indiscriminate' or, more colloquially, 'shouter' broadcast. When no destination VAN ID is present, the message is available for every device capable of receiving/decoding it. When a VAN ID other than 0xFFFF is present, the intended receiver is device within the specified VAN. The use of this mode allows a receiver to differentiate between 'shouter' messages, which may have no particular relevance, and 'normal' broadcast messages that, by implication, are intended to be received by all devices. Normal broadcast messages are passed up to the upper layers for processing while 'shouter' broadcast messages may be discarded by the MAC.

The inventors of the present invention have discovered that for purely unidirectional operation, from a device to a handheld receiver, some of the fields of Table 1 and Table 2 have limited value. It would therefore be advantageous if these fields did not have to be transmitted. In a step S4 bits in a second subfield of the ordered data portions indicative of whether one or two frame control fields/octets is/are present in said ordered data portions are therefore defined by the processing unit 2 of the transmitting lighting device 1*a*. Upon reception of a message comprising the second subfield the processing unit 6 of the receiving lighting device 1*b* reads bits in the subfield of the ordered data portions indicative of whether one or two frame control fields/octets is/are present in the ordered data portions, step S24. The processing unit 6 of the receiving lighting device 1*b* reads the first frame control field/octet, step S26. Optionally, depending on the bits in the second subfield, the processing unit 6 of the receiving lighting device 1*b* in step S26 also reads the second frame control field/octet. In addition, for device-to-device operation, it may be necessary to quickly send a short (one or two byte) command to a group of devices whereby each device relays the command to its neighbors. A MAC header according to Table 9 is therefore proposed.

TABLE 9

| Octets: 1/2 | 0/1 | 0/2 | 0/2/8 | 0/2 | 0/2/8 | arb. |
|---|---|---|---|---|---|---|
| Frame Control | Sequence Number | Destination VAN Identifier | Destination Address | Source VAN Identifier | Source Address | Auxiliary Security Header |
| | | | Addressing fields | | | |
| | | | MHR | | | |

According to this table the first field/octet of the Frame Control field indicates 1) the frame type, 2) whether a second Control Field field/octet is present, and 3) the addressing modes. A device is enabled to repeat a packet in order that a third device, too far from the sender to receive the main transmission, can at least receive the repeat. The frame version bits advantageously have meaning according to Table 10.

TABLE 10

| Bits: b0 b1 | Description |
|---|---|
| 00 | Frame compatible with the CL standard, single Frame Control field/octet |
| 10 | Reserved |
| 01 | Reserved |
| 11 | Frame compatible with the CL standard, two Frame Control fields/octets |

Use of the frame version field in this proposed way advantageously avoids the need to use a separate bit to indicate the presence or absence of the second field/octet and also enables a simple receiver to ignore packets that include the second field/octet on the grounds that it will not be able to support a feature indicated in the second field/octet. In a step S6 the message 6 comprising the first subfields, the first frame control field/octet and optionally, depending on the defined bits in the second subfield, the second frame control field/octet is transmitted by the transmitter 3 of the transmitting lighting device 1*a*. The transmitted message 6 may further include other parts of the MAC header as disclosed above. The message 6 may be transmitted by visible light communications, also called coded light communications. The transmitter 3 may therefore have a light emitter. Upon transmission of the message 6 the receiver 4 of the receiving lighting device 1*b* receives the message, step S20. When the second frame control field/octet is not present, the subfields that comprise it are assumed by the receiving lighting device 1b to take certain default values. Indeed, one of the address mode subfields could be placed in this second field/octet. If the DAM is placed here, for example, then broadcast packets that do not use a destination address do not need to carry the second frame control field/octet. Because no DAM is explicitly received, the receiving lighting device 1b understands it to be set to indicate 'No destination address'. If present, the second field/octet is preferably defined according to Table 11.

TABLE 11

| Bits: 8-9 | 10 | 11 | 12-13 | 14-15 |
|---|---|---|---|---|
| Frame Type | Security Enabled | Frame Pending | ACK Request; Sequence Number Present | Reserved |

When the second field/octet is not transmitted, rather than being redundant and unused, the fields contained take on defined default values. Thus, absence of the second field/octet implies: 1) the packet is a data frame, 2) there is no security enabled, 3) there is no pending frame indicated, 4) no sequence number is used, and 5) an acknowledgement is not requested. A change from any of these default positions thus inherently implies either a longer packet (security enabled) or bidirectional operation (for which economy of transmission is not a prime concern) (frame type is other than data, frame pending is set (i.e., more data is to come), acknowledgement is requested). Simple unidirectional receivers that do not support security can therefore automatically ignore any packets that included the second field/octet, see Table 12.

TABLE 12

| Bits b12 b13 | Description |
|---|---|
| 00 | No ACK requested, no sequence number |
| 10 | Reserved |
| 01 | No ACK requested, sequence number present |
| 11 | ACK requested, sequence number present |

Compared to the existing IEEE 802.15.4 standard protocol, the fields have thus been rearranged and there are three more information bits. To accommodate these, the number of Frame Type bits are preferably reduced from three bits to two bits to indicate the presence or absence of the second frame control byte in the frame version and maintaining only two reserved bits. The existing IEEE 802.15.4 standard protocol defines four packet types: Data, Acknowledgement, Beacon and MAC Control. The other four possibilities are reserved for possible future use.

The arrangement described works well with the applications outlined above. Alternative arrangements are also possible. For example, for device-to-device applications, there may be no merit in indicating the source of the command. Therefore, if such applications have highest priority, the source address mode may be moved in its entirety to the second field/octet. On the other hand, in download applications, the source address may be regarded as more important and the destination address less important. If this is considered to be the more important application, then the destination address may be moved to the second field/octet. In either case, the reserved bits may be moved to the first field/octet to allow for future expansion.

Alternatively more flexible use of one of the other features may be allowed, such as security or sequence numbering.

Concepts such as anonymous transmissions, indiscriminate broadcasts, addressing mode which uses short, such as 8-byte, addresses but no VAN ID have been developed. These features may be readily implemented in the visible light communications standard by assigning a meaning to certain bit patterns as disclosed above. In order to do so, bits in the existing IEEE 802.15.4 standard protocol are interpreted and/or defined in ways that were not foreseen in the existing standard. Thus, new functionality may be achieved without adding new bits to the transmitted messages. The disclosed embodiments are particularly advantageous for applications relating to visible light communications.

The invention has mainly been described above with reference to a few embodiments. The invention may in particular be applied to lighting control systems or visible light networking. However, as is readily appreciated by a person skilled in the art, other embodiments than the ones disclosed above are equally possible within the scope of the invention, as defined by the appended patent claims.

The invention claimed is:

1. A method for transmitting a message in a network via visible light communication, the message comprising a sequence of ordered data portions, wherein said sequence of ordered data portions comprises address fields and at least one frame control field, the method comprising: defining bits in a first subfield of the ordered data portions indicative of use of said address fields, and defining bits in a second subfield of the ordered data portions indicative of whether two frame control fields are present in said ordered data portions; transmitting said message comprising said first subfield and a first frame control field of the at least one frame control field, wherein said message comprises a second frame control field of said at least one frame control field when said bits of said second subfield indicate that said second frame control field is present in said ordered data portions, and wherein said message comprises a medium access control (MAC) header, wherein the MAC header comprises said first frame control field and comprises said second frame control field when said bits of said second subfield indicate that said second frame control field is present in said ordered data portions, and wherein said MAC header at least comprises said first subfield and said second subfield.

2. The method according to claim 1, wherein said bits of said first subfield are further indicative of a destination address not being present in said MAC header.

3. The method according to claim 1, wherein said bits of said first subfield are further indicative of a source address not being present in said MAC header.

4. The method according to claim 1, wherein said first subfield has a first sub-subfield which represents group identifier compression.

5. The method according to claim 4, wherein said first sub-subfield has one bit, the method further comprising:
defining said one bit of said first sub-subfield to decimal value '1' with a meaning of a presence of a destination group identifier, whereby a source group identifier is not transmitted and is equal to the destination group identifier.

6. The method according to claim 1, wherein said first subfield has a second sub-subfield which represents destination addressing mode (DAM).

7. The method according to claim 6, the method further comprising:

defining bits of said second sub-subfield with a meaning that a group identifier is not present and a destination address is at least eight bytes.

8. The method according to claim 1, wherein said first subfield has a third sub-subfield which represents source addressing mode (SAM).

9. The method according to claim 8, the method further comprising:
defining bits of said third sub-subfield with a meaning that a group identifier is not present and a source address is at least eight bytes.

10. The method according to claim 1, wherein said second subfield has a first sub-subfield which represents frame version and wherein said bits indicative of whether two frame control fields are present in said ordered data portions are part of said first sub-subfield.

11. A method for receiving a message in a network via visible light communication, the message comprising a sequence of ordered data portions, wherein said sequence of ordered data portions comprises address fields and at least one frame control field, the method comprising: receiving the message; and reading bits in a first subfield of the ordered data portions indicative of whether two frame control fields are present in said ordered data portions; and reading a first frame control field of said at least one frame control field and, when said bits of said first subfield indicate that a second frame control field of the at least one frame control field is present in said ordered data portions, reading the second frame control field, wherein said message comprises a medium access control (MAC) header, wherein the MAC header comprises said first frame control field and comprises said second frame control field when said bits of said second subfield indicate that said second frame control field is present in said ordered data portions, and wherein said MAC header at least comprises said first subfield and said second subfield.

12. A transmitting lighting device for transmitting a message in a network via visible light communication, the message comprising a sequence of ordered data portions, wherein said sequence of ordered data portions comprises address fields and at least one frame control field, the lighting device comprising: a processing unit arranged to define bits in a first subfield of the ordered data portions indicative of whether two frame control fields are present in said ordered data portions; and a transmitter arranged to transmit said message comprising said first subfield; and a first frame control field of said at least one frame control field, wherein said message comprises a second frame control field of said at least one frame control field when said bits of said first subfield indicate that said second frame control field is present in said ordered data portions, wherein said message comprises a medium access control (MAC) header, wherein the MAC header comprises said first frame control field and comprises said second frame control field when said bits of said second subfield indicate that said second frame control field is present in said ordered data portions, and wherein said MAC header at least comprises said first subfield and said second subfield.

13. A receiving lighting device for receiving a message in a network via visible light communication, the message comprising a sequence of ordered data portions, wherein said sequence of ordered data portions comprises address fields and at least one frame control field, the lighting device comprising: a receiver arranged to receive the message; and a processing unit arranged to read bits in a first subfield of the ordered data portions indicative of whether two frame control fields are present in said ordered data portions; and arranged to read a first frame control field of said at least one frame control field, and read a second frame control field of said at least one frame control field when said bits of said second subfield indicate that first frame control field is present in said ordered data portions, wherein said message comprises a medium access control (MAC) header, wherein the MAC header comprises said first frame control field and comprises said second frame control field when said bits of said second subfield indicate that said second frame control field is present in said ordered data portions, and wherein said MAC header at least comprises said first subfield and said second subfield.

14. The method according to claim 1, wherein said first frame control field and said second frame control field are within a same frame.

15. The method according to claim 11, wherein said first frame control field and said second frame control field are within a same frame.

16. The transmitting lighting device of claim 12, wherein said first frame control field and said second frame control field are within a same frame.

17. The receiving lighting device of claim 13, wherein said first frame control field and said second frame control field are within a same frame.

* * * * *